UNITED STATES PATENT OFFICE.

FREDERICK B. LA FORGE, OF WASHINGTON, DISTRICT OF COLUMBIA.

PROCESS OF MANUFACTURING GULONIC LACTONE.

1,285,248.  Specification of Letters Patent.  Patented Nov. 19, 1918.

No Drawing.  Application filed April 13, 1918. Serial No. 228,386.

(DEDICATED TO THE PUBLIC.)

*To all whom it may concern:*

Be it known that I, FREDERICK B. LA FORGE, a citizen of the United States of America, and an employee of the Department of Agriculture of the United States of America, residing at Washington, D. C., (whose post-office address is Department of Agriculture, Washington, D. C.,) have invented a new and useful Process of Manufacturing Gulonic Lactone.

This application is made under the act of March 3, 1883, chapter 143 (22 Stat. 625), and the invention herein described and claimed may be used by the Government of the United States, or any of its officers or employees, in the prosecution of work for the Government, or any person in the United States, without payment to me of any royalty thereon.

My invention relates to the preparation of gulonic lactone by the addition of hydrocyanic acid to the pentose sugar xylose in aqueous solution.

In the practice of my invention, the necessary hydrocyanic acid is first generated in solution by adding the required amount of sulfuric acid to sodium or potassium cyanid dissolved in cold water. To this solution the xylose is added, together with a few drops of ammonia, and the solution is then allowed to stand until its optical rotation has become constant, which requires about six or seven hours. Sulfuric acid is then added to the solution in quantity sufficient to convert the sodium present therein into acid sodium sulfate, and to convert the ammonia formed by saponification of the nitril of gulonic acid resulting from the reaction into ammonium sulfate. Both the acid sodium sulfate and ammonium sulfate being very soluble in water, neither interferes with the crystallization of the gulonic lactone which takes place when the above mentioned solution is concentrated to a syrup, by evaporation. After standing for some time in the cold the lactone which has crystallized from the concentrated solution is filtered off and washed with cold water.

The reactions involved are expressed by the following equations:

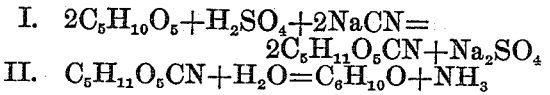

The following experiment may serve as a typical example:

Forty grams of sodium cyanid were dissolved in 200 cc. of cold water and to this solution 80 grams of cold 50% surfuric acid were added. The resulting solution then contained sufficient hydrocyanic acid to combine with 100 grams of xylose. This amount of xylose was added to the solution which was allowed to stand for about 20 hours. After this time 84 grams of 95% sulfuric acid mixed with a small amount of water were added and the solution concentrated under reduced pressure to a thick syrup. After standing for several hours this syrup had become filled with the crystalline mass, which consisted chiefly of gulonic lactone. The crystals were filtered off and washed with a small amount of cold water. The resulting product was nearly pure gulonic lactone. The yield was approximately 40 grams.

Having thus described my invention, I claim:

The process of manufacturing gulonic lactone comprising reacting with hydrocyanic acid upon xylose in aqueous solution, adding sulfuric acid in sufficient amount to neutralize the ammonia formed in the reaction, and to convert the sodium into acid sodium sulfate, evaporating under reduced pressure, allowing the gulonic lactone to crystallize on standing, separating the crystals and washing them with cold water.

In testimony whereof I affix my signature in the presence of two subscribing witnesses.

FREDERICK B. LA FORGE.

Witnesses:
L. S. HULBERT,
ARTHUR J. DECKER.